United States Patent
Kawamata

(10) Patent No.: US 11,146,152 B2
(45) Date of Patent: Oct. 12, 2021

(54) BRUSH OF MOTOR FOR AUTOMOTIVE ELECTRONICS

(71) Applicant: TRIS INC., Matsusaka (JP)

(72) Inventor: Kenji Kawamata, Mie (JP)

(73) Assignee: TRIS INC., Mie (JP)

( * ) Notice: Subject to any disclaimer, the term of this patent is extended or adjusted under 35 U.S.C. 154(b) by 0 days.

(21) Appl. No.: 16/765,887

(22) PCT Filed: Nov. 20, 2018

(86) PCT No.: PCT/JP2018/042803
§ 371 (c)(1),
(2) Date: May 21, 2020

(87) PCT Pub. No.: WO2019/107218
PCT Pub. Date: Jun. 6, 2019

(65) Prior Publication Data
US 2020/0358342 A1    Nov. 12, 2020

(30) Foreign Application Priority Data
Dec. 1, 2017 (JP) .............................. JP2017-231447

(51) Int. Cl.
H01R 39/26 (2006.01)
H02K 13/10 (2006.01)
H01R 39/22 (2006.01)

(52) U.S. Cl.
CPC ............. H02K 13/10 (2013.01); H01R 39/22 (2013.01); *H01R 2201/10* (2013.01)

(58) Field of Classification Search
CPC ...... H01R 39/04; H01R 39/025; H01R 39/20; H01R 39/26; H01R 13/03
See application file for complete search history.

(56) References Cited

U.S. PATENT DOCUMENTS

| | | | | |
|---|---|---|---|---|
| 4,799,957 A | * | 1/1989 | Vogel | B60L 5/205 252/502 |
| 5,144,181 A | * | 9/1992 | Shibuya | C04B 35/52 252/502 |
| 10,199,788 B1 | * | 2/2019 | Argibay | H01R 39/025 |
| 10,855,149 B2 | * | 12/2020 | Hirabayashi | F02N 11/08 |
| 2016/0172809 A1 | * | 6/2016 | Holzapfel | H01R 39/64 439/13 |
| 2018/0105457 A1 | | 4/2018 | Ito et al. | |
| 2020/0199425 A1 | * | 6/2020 | Lara Rodriguez | B24D 5/12 |
| 2020/0313376 A1 | * | 10/2020 | Hirabayashi | C04B 35/522 |

FOREIGN PATENT DOCUMENTS

| | | |
|---|---|---|
| EP | 2 858 219 B1 | 12/2018 |
| GB | 2 247 232 A | 2/1992 |
| JP | 2000-197315 A | 7/2000 |
| JP | 2003-347006 A | 12/2003 |

OTHER PUBLICATIONS

Official Communication issued in International Patent Application No. PCT/JP2018/042803, dated Dec. 18, 2018.

* cited by examiner

*Primary Examiner* — Dang D Le
(74) *Attorney, Agent, or Firm* — Keating & Bennett, LLP

(57) ABSTRACT

A brush for a motor for electrical equipment in an automobile includes a main brush portion containing carbon and an abrasive having a Vickers hardness higher than or equal to 10 GPa and lower than or equal to 14 GPa. The sliding noise of the brush is reduced in the brush for a motor for electrical equipment in an automobile.

6 Claims, 3 Drawing Sheets

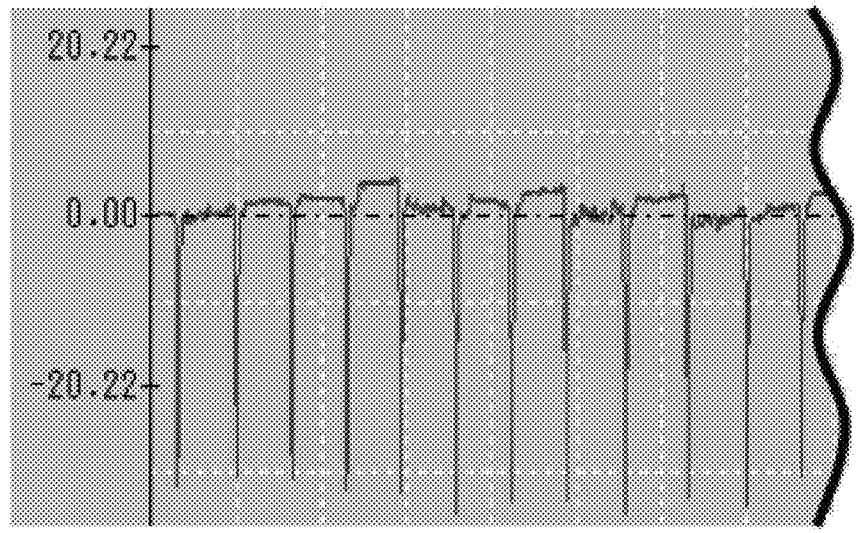
F I G. 3A
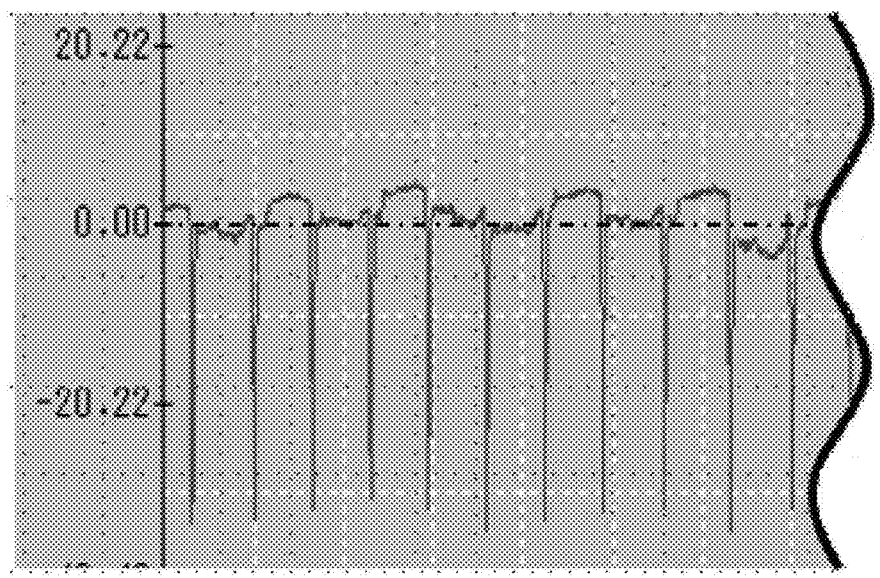
F I G. 3B

BRUSH OF MOTOR FOR AUTOMOTIVE ELECTRONICS

FIELD

The present invention relates to a brush for a motor for electrical equipment in an automobile.

BACKGROUND

A brush for a motor contains abrasive particles of, for example, $SiO_2$ or $Al_2O_3$. They are added for removing an oxidation film resultant from contact with a commutator. However, the abrasive contained in the brush for removing the oxidation film causes sometimes sliding noise from the brush in the motor. In particular, when a brush for a motor for electrical equipment in an automobile causes sliding noise, the noise annoys the occupants, since the distance from the motor to the occupants is short and such noise may echo in the cabin. The sliding noise from the brush increases generally as the brush temperature is higher.

Related pieces of prior art will be described. Patent Literature 1 (JP6106667B) describes a motor for a washing machine or a motor for a power tool; the motor includes a brush impregnated with a dispersion liquid formed from a petroleum solvent and fat. In Patent Literature 1, the fat transfers to a sliding surface of the brush in contact with a commutator during operation of the motor and functions as a lubricant for reducing sliding noise.

Patent Literature 2 (JP2003-347006A) describes a metal graphite brush for a motor containing $Al_2O_3$ as an abrasive. Patent Literature 2 does not describe the type of a motor or the sliding noise of a brush. However, Patent Literature 2 describes the preferable examples of an abrasive, including, in addition to alumina, silica, iron oxide, titanium oxide, zirconia, boron nitride, silicon carbide, tungsten carbide, coke, and mesophase carbon. But it does not describe specific data about an abrasive other than alumina. Patent Literature 3 (JP2000-197315A) describes a brush containing SiC, $SiO_2$, or $Al_2O_3$, added as an abrasive. The brush is used for a motor for an electric machine such as a vacuum cleaner or a power tool.

CITATION LIST

Patent Literature

Patent Literature 1: JP6106667B
Patent Literature 2: JP2003-347006A
Patent Literature 3: JP2000-197315A

SUMMARY OF THE INVENTION

Technical Problem

The object of the present invention is to reduce the sliding noise of a brush for a motor for electrical equipment in an automobile.

Solution to the Problem

One or more aspects of the present invention are directed to reducing the sliding noise of a brush for a motor for electrical equipment in an automobile.

The brush for a motor for electrical equipment in an automobile, according to the present invention, includes a main brush portion containing carbon and an abrasive having a Vickers hardness higher than or equal to 10 GPa and lower than or equal to 14 GPa. The main brush portion is a portion of the brush excluding the lead and connection parts and is slidable over a commutator.

The inventor noticed a correlation between the hardness of an abrasive and the sliding noise. More specifically, a brush containing an abrasive with the Vickers hardness higher than or equal to 10 GPa and lower than or equal to 14 GPa reduces the sliding noise (Table 3). The examples of the abrasive with the Vickers hardness higher than or equal to 10 GPa and lower than or equal to 14 GPa include MN (with the Vickers hardness of 10.4 Gpa), $3Al_2O_3 \cdot 2SiO_2$ (mullite, with the Vickers hardness of 10.8 Gpa), $ZrO_2$ (with the Vickers hardness of 12.5 Gpa), and $Si_3N_4$ (with the Vickers hardness of 14.0 Gpa). In the present invention, the sliding noise of a brush is reduced to increase silence in the cabin of an automobile.

The main brush portion preferably contains an abrasive at a concentration higher than or equal to 0.1 wt % and lower than or equal to 2.0 wt %, more preferably, higher than or equal to 0.3 wt % and lower than or equal to 1.0 wt %. As shown in Table 4, a brush containing the abrasive at a concentration higher than or equal to 0.1 wt % further reduces the sliding noise. A brush containing the abrasive at a concentration lower than or equal to 2.0 wt % reduces the wear loss. A brush containing the abrasive at a concentration of about 0.5 wt % particularly reduces the sliding noise. Thus, a brush more preferably contains the abrasive at a concentration higher than or equal to 0.3 wt % and lower than or equal to 1.0 wt %.

Preferably, the main brush portion contains a metal at a weight ratio between the carbon and the metal being lower than or equal to 90:10 and higher than or equal to 40:60, and more preferably, lower than or equal to 85:15 and higher than or equal to 60:40. Examples of the metal include copper, a copper alloy such as brass, silver, and tin. The brush containing a metal at a weight ratio between carbon and the metal being lower than or equal to 90:10, or particularly, lower than or equal to 85:15 reduces the wear loss. The brush containing a metal at a weight ratio between carbon and the metal being higher than or equal to 40:60 reduces the sliding noise, and the brush containing a metal at a weight ratio between carbon and the metal being higher than or equal to 60:40 further reduces the sliding noise (refer to Table 5).

More preferably, the abrasive is $ZrO_2$. As shown in Table 3, the brush containing $ZrO_2$ minimizes the sliding noise while having a wear loss within an allowable range.

Preferably, the brush contains $ZrO_2$ with an average particle diameter less than or equal to 30 µm, or more preferably, greater than or equal to 5 µm and less than or equal to 20 µm when the particle diameter of a $ZrO_2$ particle is the maximum Feret diameter prescribed by JIS Z8827-1: 208. As shown in Table 6, a brush containing $ZrO_2$ with an average particle diameter greater than 30 µm increases the wear loss. A brush containing $ZrO_2$ with an average particle diameter greater than or equal to 5 µm and less than or equal to 20 µm reduces the sliding noise and the wear loss. The maximum Feret diameter (the maximum distance between two parallel lines holding a $ZrO_2$ particle between them) is used as the particle diameter, because the function of the abrasive seems to be dependent on the maximum Feret diameter that indicates the major axis size of an abrasive particle.

BRIEF DESCRIPTION OF DRAWINGS

FIG. 3A is a graph showing the roundness of a commutator after sliding contact with a brush according to Example 1, and FIG. 3B is a graph showing the roundness of a commutator after sliding contact with a brush according to Comparative Example 1.

DETAILED DESCRIPTION

Figure 1:
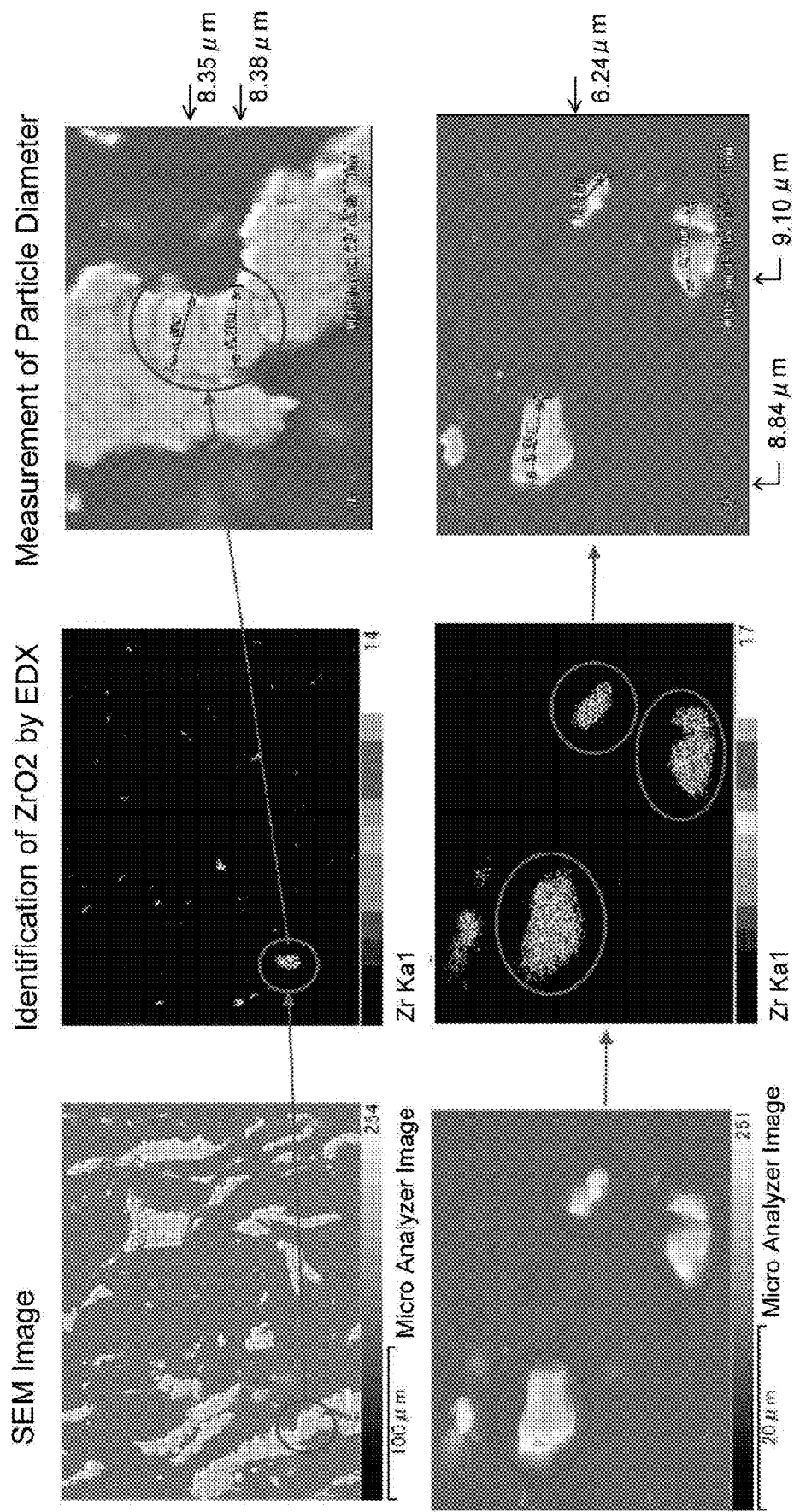
FIG. 1 shows photographs of a method for measuring a particle diameter of the abrasive included in a brush according to an embodiment.

One or more preferred embodiments of the present invention will now be described. The present invention is not limited to these embodiments, but is defined based on the scope of the claims and can be modified by adding matters known by those skilled in the art to the embodiments.

Embodiments

Flake natural graphite with an average particle diameter of 50 µm, an abrasive of, for example, $ZrO_2$ (with the Vickers hardness of 12.3 Gpa), a solid lubricant, $MoS_2$ (with an average particle diameter of 2.5 µm and a content of 0.5 wt % in the brush), and a phenol resin binder (equivalent to a carbon content of 5 wt % in the brush) are kneaded by a mixer to be homogeneous, and pulverized into a powder passable through a 32-mesh sieve to form a resin-treated graphite powder. An electrolytic copper powder with an average particle diameter of 30 µm is added to the obtained resin-treated graphite powder, and mixed with a V-shaped mixer until being homogeneous to form a material for the main brush portion. The obtained material for the main brush portion is molded under a pressure of 0.20 MPa, and baked in a predetermined atmosphere to form a brush, including a lead, for a motor for electrical equipment in an automobile. The phenol resin binder is converted into carbon. Thus, brushes containing $ZrO_2$ that differ in average particle diameter and content are formed, and brushes containing $3Al_2O_3 \cdot 2SiO_2$ (mullite, with the Vickers hardness of 10.8 Gpa) or $Si_3N_4$ (silicon nitride, with the Vickers hardness of 14.0 Gpa) are formed as examples including a material other than $ZrO_2$. Brushes of comparative examples contain SiC (with the Vickers hardness of 23.0 Gpa), $Al_2O_3$ (with the Vickers hardness of 15.2 Gpa), or $SiO_2$ (with the Vickers hardness of 9.0 Gpa). The composition and the manufacturing conditions, excluding the type of an abrasive, the particle diameter, and the content, are the same for the brushes.

Instead of an electrolytic copper powder, examples of a metal powder include an atomized copper powder, a silver powder, a copper alloy powder such as a brass powder, a tin powder, or a mixture of these powders. The type of metal powder and the average particle diameter may be selected as appropriate. The type of graphite and the average particle diameter may be selected as appropriate. The type and the content of a binder may be selected as appropriate. Instead of a phenol resin, polyether ether ketone (PEEK), polyphenylene sulfide (PPS), or other materials may be used. The total content of graphite and the carbon from the binder is used as the carbon content. Instead of $MoS_2$, another solid lubricant such as $WS_2$ may be used. The presence or absence of a solid lubricant and the content, the type, and the average particle diameter of the solid lubricant may be selected as appropriate. The brush may also contain components other than carbon, metal, an abrasive, and a solid lubricant. The average particle diameters of components other than the abrasive are measured in the powder form by the laser light scattering method.

The average particle diameter of the abrasive is measured after a brush is cut, the brush is embedded in a resin, and the resin surface is ground. In the measurement, the surface is observed with a scanning electron microscope (SEM, such as S-300N manufactured by Hitachi High-Tech), and the abrasive particles are observed with an energy dispersion X-ray analyzer (EDX, such as EMAX ENERGY EX-250 manufactured by HORIBA, Ltd.) attached to the SEM to identify the particles of the abrasive. From the SEM image, the maximum distance (maximum Feret diameter) between two parallel lines holding the abrasive particle between them is determined as the particle diameter. The maximum Feret diameters of 100 abrasive particles are measured, and the arithmetic mean of the diameters is used as the average particle diameter of the abrasive. As described above, the maximum Feret diameter is prescribed by JIS Z8827-1: 2008.

FIG. 1 shows SEM images and EDX images at two positions captured during measurement of the average particle diameter of $ZrO_2$ in a brush according to a preferred embodiment (Example 1). The maximum Feret diameter is used, without using laser light scattering or another method that may be inappropriate for measuring the average particle diameter in a brush. In addition to the maximum Feret diameter, for example, the minimum Feret diameter may also be considered for the size of the abrasive particle. However, the function of the abrasive is defined by the maximum Feret diameter rather than, for example, the minimum Feret diameter. In other words, the abrasion function of the abrasive particle having a major axis and a minor axis is more likely to depend on the major axis rather than the minor axis. Thus, the maximum Feret diameter is used as the particle diameter of the abrasive particle. The maximum Feret diameters are 8.35 µm and 8.38 µm in the upper right of FIG. 1 and are 8.84 µm, 6.24 µm, and 9.10 µm in the lower right of FIG. 1.

Figure 2:
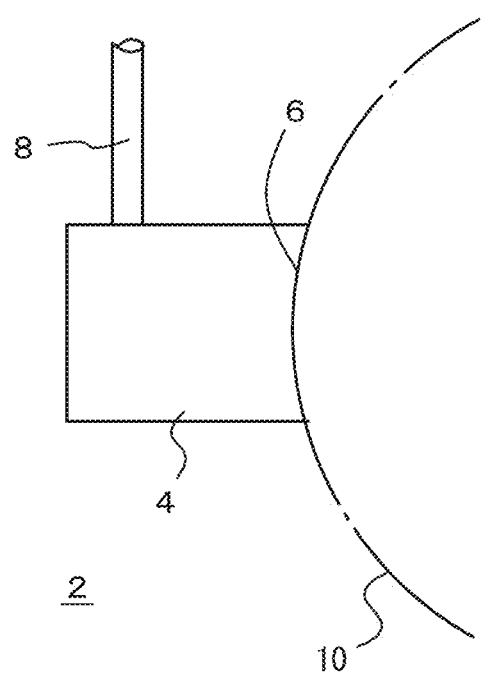
FIG. 2 is a side view of a brush according to an embodiment.

FIG. 2 shows a brush 2 of a motor for electrical equipment in an automobile. The brush 2 includes a main brush portion 4 and a lead 8 attached to the main brush portion 4. The brush 2 comes in contact with a commutator 10 of the motor at a sliding surface 6. The brush 2 may be a multiple-layered brush such as a double-layered brush or a triple-layered brush. The multiple-layered brush may include at least one layer, or preferably, all the layers according to embodiments of the present invention.

The brushes according to the examples and comparative examples were evaluated as follows. First, the resistivity of each brush was measured. Each brush was subsequently installed in a motor for electrical equipment in an automobile and operated for 200 hours. Thereafter, the motor was operated in a soundproof chamber, and the noise from the motor was measured by a noise meter. Thereafter, the brush and the commutator were removed from the motor, the wear loss of the brush was measured, and the roundness of the outer circumference of the commutator was measured. The conditions for a 200-hour operation, such as the surrounding temperature, the amount of airflow, and the motor operating voltage are the same for all the brushes, and the conditions for measurement with the noise meter are also the same for all the brushes. Tables 1 and 2 show the results. The total amount of graphite and carbon from a binder is used as the amount of carbon, and the content of $MoS_2$ remains at 0.5 wt %.

TABLE 1

| | Material/quality | | | Example 1 Preferred embodiment | Example 2 Abrasive amount: upper limit Wear loss: slightly large | Example 3 Abrasive amount: lower limit Noise: slightly large | Example 4 Particle diameter: slightly large Wear loss: slightly large | Example 5 Particle diameter: lower limit Noise: slightly large | Example 6 Mullite used Noise/wear loss: slightly large | Example 7 Metal amount: upper limit Noise: slightly large | Example 8 Metal amount: lower limit Electric resistance: slightly high | Example 9 Si$_3$N$_4$ used Vickers hardness: 14 GPa |
|---|---|---|---|---|---|---|---|---|---|---|---|---|
| Material | Metal (Cu) | Ratio of compound | wt % | 23 | 23 | 23 | 23 | 23 | 23 | 48 | 15 | 23 |
| | Carbon | Ratio of compound | wt % | 76 | 74.7 | 76.3 | 76 | 76 | 76 | 51 | 84 | 76 |
| | Abrasive | ZrO$_2$ | wt % | 0.5 | 1.8 | 0.2 | 0.5 | 0.5 | — | 0.5 | 0.5 | — |
| | | Particle diameter | μm | 9.3 | 8.5 | 9.2 | 22.0 | 4.5 | — | 7.8 | 15.2 | — |
| | | Vickers hardness | GPa | 12.5 | 12.5 | 12.5 | 12.5 | 12.5 | — | 12.5 | 12.5 | — |
| | | 3Al$_2$O$_3$•2SiO$_2$ | wt % | — | — | — | — | — | 0.5 | — | — | — |
| | | Particle diameter | μm | — | — | — | — | — | 28.5 | — | — | — |
| | | Vickers hardness | GPa | — | — | — | — | — | 10.8 | — | — | — |
| | | Si$_3$N$_4$ | wt % | — | — | — | — | — | — | — | — | 0.5 |
| | | Particle diameter | μm | — | — | — | — | — | — | — | — | 23.5 |
| | | Vickers hardness | GPa | — | — | — | — | — | — | — | — | 14.0 |
| | Total | | | 99.5 | 99.5 | 99.5 | 99.5 | 99.5 | 99.5 | 99.5 | 99.5 | 99.5 |
| Quantity | Noise | dB-A | ≤60 dB | 50 | 53 | 58 | 55 | 58 | 56 | 58 | 52 | 58 |
| | Wear loss | | ≤0.9 mm | 0.8 | 0.85 | 0.78 | 0.88 | 0.6 | 0.85 | 0.7 | 0.8 | 0.85 |
| | Resistivity | μΩ · cm | 350-900 | 630 | 630 | 610 | 625 | 620 | 630 | 100 | 1500 | 650 |
| | Commutator appearance | Roundness evaluation | | Good (G) | Fair (F) | F | G | F | F | F | G | F |

TABLE 2

| | Material/quality | | | Comparative Example 1 Hardness: excessively high Noise: large Wear loss: large | Comparative Example 2 Hardness: excessively low Noise: large | Comparative Example 3 Al$_2$O$_3$ |
|---|---|---|---|---|---|---|
| Material | Metal (Cu) | Ratio of compound | wt % | 25 | 25 | 25 |
| | Carbon | Ratio of compound | wt % | 74 | 74 | 74 |
| | Abrasive | Content of SiC | wt % | 0.5 | — | — |
| | | Particle diameter | μm | 10.5 | — | — |
| | | Vickers hardness | GPa | 23.0 | — | — |
| | | Content of SiO$_2$ | wt % | — | 0.5 | — |
| | | Particle diameter | μm | — | 18.5 | — |
| | | Vickers hardness | GPa | — | 8.7 | — |
| | | Content of Al$_2$O$_3$ | wt % | — | — | 0.5 |
| | | Particle diameter | μm | — | — | 10.6 |
| | | Vickers hardness | GPa | — | — | 15.2 |
| | Total | | | 99.5 | 99.5 | 99.5 |

TABLE 2-continued

| Material/quality | | | Comparative Example 1 Hardness: excessively high Noise: large Wear loss: large | Comparative Example 2 Hardness: excessively low Noise: large | Comparative Example 3 Al₂O₃ |
|---|---|---|---|---|---|
| Quantity | Noise | dB A ≤60 dB | 70 | 65 | 66 |
| | Wear loss | ≤0.9 mm | 0.95 | 0.8 | 0.92 |
| | Resistivity | μΩ · cm 350-900 | 650 | 625 | 630 |
| | Commutator appearance | Roundness evaluation | Poor (P) | P | P |

Table 3 shows the correlation between the Vickers hardness of the abrasive and the noise level (sliding noise of the brush from the motor) extracted from Tables 1 and 2. The Vickers hardness is in GPa below. As clearly shown in Table 3, the noise level correlates with the Vickers hardness of the abrasive, and the noise level is reduced with the abrasive with the Vickers hardness higher than or equal to 10 and lower than or equal to 14. The best result was obtained for $ZrO_2$ having the Vickers hardness of 12.5. Aluminum nitride (AlN, with the Vickers hardness of 10.4 Gpa) has a noise level and a wear loss similar to those of $3Al_2O_3 \cdot 2SiO_2$ (mullite, with the Vickers hardness of 10.8 Gpa).

TABLE 3

Vickers hardness of abrasive, noise level, and wear loss of brush

| Comparative Example 2 | SiO₂ | hardness of 8.7 | 65 dB | 0.8 mm |
| Example 6 | 3Al₂O₃·2SiO₂ | hardness of 10.8 | 56 dB | 0.85 mm |
| Example 1 | ZrO₂ | hardness of 12.5 | 50 dB | 0.8 mm |
| Example 9 | Si₃N₄ | hardness of 14.0 | 58 dB | 0.85 mm |
| Comparative Example 3 | Al₂O₃ | hardness of 15.2 | 66 dB | 0.92 mm |
| Comparative Example 1 | SiC | hardness of 23.0 | 70 dB | 0.95 mm |

Table 4 shows the correlation between the content of the abrasive ($ZrO_2$), the average particle diameter, the noise level, and the wear loss extracted from Tables 1 and 2. Table 4 shows the samples having similar average particle diameters. Irrespective of the content of the abrasive, the samples containing $ZrO_2$ as the abrasive reduced the noise level compared with Comparative Examples 1 to 3 (with the Vickers hardness lower than 10 or higher than 14). The samples containing 0.2 wt %, 0.5 wt %, and 1.8 wt % of $ZrO_2$ achieved sufficient silence while reducing the wear loss. The sample containing 0.5 wt % of $ZrO_2$ achieved the highest performance. These results show that the content of the abrasive is preferably higher than or equal to 0.1 wt % and lower than or equal to 2.0 wt %, more preferably, higher than or equal to 0.2 wt % and lower than or equal to 1.8 wt %, and most preferably, higher than or equal to 0.3 wt % and lower than or equal to 1.0 wt %.

TABLE 4

Content of abrasive (ZrO₂), average particle diameter, noise level, and wear loss

| Example 3 | ZrO₂ | 0.2 wt % | 9.2 μm | 58 dB | 0.78 mm |
| Example 1 | ZrO₂ | 0.5 wt % | 9.3 μm | 50 dB | 0.8 mm |
| Example 2 | ZrO₂ | 1.8 wt % | 8.5 μm | 53 dB | 0.85 mm |

Brushes containing 0.5 wt % of $ZrO_2$ with different weight ratios between a metal and graphite are extracted from Tables 1 and 2. Table 5 shows the effect of the weight ratio between a metal and graphite on the noise level, the wear loss, and the resistivity. As clearly shown in Table 5, to optimize the noise level and the wear loss, the weight ratio between carbon and a metal is preferably lower than or equal to 90:10 and higher than or equal to 40:60, and particularly preferably, lower than or equal to 85:15 and higher than or equal to 40:60.

TABLE 5

Weight ratio of carbon/metal, average particle diameter of ZrO₂, noise level, wear loss, and resistivity

| Example 8 | 84:15 | 15.2 μm | 52 dB | 0.8 mm | 1500 μΩ · cm |
| Example 1 | 76:23 | 9.3 μm | 50 dB | 0.8 mm | 630 μΩ · cm |
| Example 7 | 51:48 | 7.8 μm | 58 dB | 0.7 mm | 100 μΩ · cm |

Table 6 shows the correlation between the average particle diameter of $ZrO_2$, the noise level, and the wear loss of a brush extracted from Tables 1 and 2. All the samples contain 0.5 wt % of $ZrO_2$. The sample with an average particle diameter of 9.3 μm (Example 1) has the lowest noise level, and the sample with an average particle diameter of 22 μm (Example 4) has an increased noise level and an increased brush wear loss. The sample with an average particle diameter of 4.5 μm (Example 5) has a small wear loss but has a high noise level. Although not particularly limited to these, the average particle diameter of $ZrO_2$ is preferably less than or equal to 30 μm, and particularly preferably, greater than or equal to 5 μm and less than or equal to 20 μm. Among samples of the abrasive with the Vickers hardness within a range of higher than or equal to 10 and lower than or equal to 14, $3Al_2O_3 \cdot 2SiO_2$ (Example 6, with the Vickers hardness of 10.8) and $Si_3N_4$ (Example 9, with the Vickers hardness of 14.0) with the same average particle diameter will behave similarly. Thus, the average particle diameter is preferably less than or equal to 30 μm, and particularly preferably greater than or equal to 5 μm and less than or equal to 20 μM.

TABLE 6

| Average particle diameter of ZrO$_2$, noise level, and wear loss | | | |
|---|---|---|---|
| Example 5 | 4.5 µm | 58 dB | 0.6 mm |
| Example 1 | 9.3 µm | 50 dB | 0.8 mm |
| Example 4 | 22 µm | 55 dB | 0.88 mm |

When the commutator surface wears unevenly due to sliding contact with the brush, the commutator surface becomes different from a true circle, and the brush noise increases. The roundness of the commutator surface after the 200-hour operation was measured with a roundness and cylindrical-shape measurement device (Roundtest RA-2000) manufactured by Mitutoyo Corporation and analyzed with an analytical software (Roundpak-F2000 Ver. 4) by Mitutoyo Corporation. FIGS. 3A and 3B show the roundness, or a deviation of the commutator surface from a perfect circle in a developed manner FIG. 3A shows the result for Example 1, and FIG. 3B shows the result for Comparative Example 1. The vertical axis represents the deviation from a perfect circle in µm. Downward spikes correspond to undercuts in the commutator and can be neglected. Examples have small deviations from a perfect circle (0.00 on the vertical axis), whereas comparative examples have large deviations. Data with a sharp change from the perfect circle represents the presence of a chip in the commutator surface. The chip mostly results from a spark discharge and indicates uneven wear of the commutator surface. Tables 1 and 2 show the roundness after 200 hours in three levels, good (G), fair (F), and poor (P).

Examples of a motor for electrical equipment in an automobile particularly desired to achieve silence include an automotive interior motor such as a power window motor, a power seat motor, or a blower motor, and a wiper motor installed in an automotive engine room adjacent to the cabin. The brush according to some embodiments of the present invention is suitable for these motors. These motors are installed in or around an automotive cabin. Among these, the brush according to some embodiments of the present invention is particularly suitable for an automotive interior motor installed in an automotive cabin, such as a power window motor, a power seat motor, or a blower motor.

A brush may contain a component other than those described in the examples.

REFERENCE SIGNS LIST

2 brush for motor for electrical equipment in automobile
4 Main brush portion
6 Sliding surface
8 Lead
10 Commutator

The invention claimed is:

1. A brush for a motor for electrical equipment in an automobile, the brush comprising:
a main brush portion containing carbon and an abrasive having a Vickers hardness higher than or equal to 10 GPa and lower than or equal to 14 GPa; wherein
the main brush portion contains a metal at a weight ratio between the carbon and the metal lower than or equal to 90:10 and higher than or equal to 40:60.

2. The brush for a motor for electrical equipment in an automobile according to claim 1, wherein the main brush portion contains the abrasive at a concentration higher than or equal to 0.1 wt % and lower than or equal to 2.0 wt %.

3. The brush for a motor for electrical equipment in an automobile according to claim 1, wherein the abrasive is ZrO$_2$.

4. The brush for a motor for electrical equipment in an automobile according to claim 3, wherein said ZrO$_2$ has an average particle diameter less than or equal to 30 µm in a maximum Feret diameter.

5. The brush for a motor for electrical equipment in an automobile according to claim 4, wherein said ZrO$_2$ particles has an average particle diameter greater than or equal to 5 µm and less than or equal to 20 µm in the maximum Feret diameter.

6. The brush for a motor for electrical equipment in an automobile according to claim 5, wherein the abrasive consists of abrasive particles.

* * * * *